(12) United States Patent
Omoto et al.

(10) Patent No.: US 9,556,497 B2
(45) Date of Patent: Jan. 31, 2017

(54) BLAST FURNACE

(71) Applicant: MITSUBISHI HEAVY INDUSTRIES, LTD., Tokyo (JP)

(72) Inventors: Setsuo Omoto, Tokyo (JP); Keiichi Nakagawa, Tokyo (JP); Tsutomu Hamada, Tokyo (JP); Masakazu Sakaguchi, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 252 days.

(21) Appl. No.: 14/371,504

(22) PCT Filed: Jan. 16, 2013

(86) PCT No.: PCT/JP2013/050623
§ 371 (c)(1),
(2) Date: Jul. 10, 2014

(87) PCT Pub. No.: WO2013/108768
PCT Pub. Date: Jul. 25, 2013

(65) Prior Publication Data
US 2015/0008626 A1 Jan. 8, 2015

(30) Foreign Application Priority Data

Jan. 18, 2012 (JP) .................. 2012-007598
Aug. 3, 2012 (JP) .................. 2012-172756

(51) Int. Cl.
*C21B 7/16* (2006.01)
*C21B 5/00* (2006.01)
(Continued)

(52) U.S. Cl.
CPC ............... *C21B 7/16* (2013.01); *C10B 53/04* (2013.01); *C10F 5/00* (2013.01); *C10L 9/083* (2013.01);
(Continued)

(58) Field of Classification Search
CPC ............ C21B 7/16; F27B 1/20; F27D 3/0033
(Continued)

(56) References Cited

U.S. PATENT DOCUMENTS 6,436,158 B1    8/2002 Fujikawa et al.
2011/0147193 A1 6/2011 Omoto et al.
(Continued)

FOREIGN PATENT DOCUMENTS

JP      6-145736 A   5/1994
JP      10-60508 A   3/1998
(Continued)

OTHER PUBLICATIONS

Machine generated English Language translation of JP 06-145736, Dec. 1994.*
(Continued)

*Primary Examiner* — Scott Kastler
(74) *Attorney, Agent, or Firm* — Westerman, Hattori, Daniels & Adrian, LLP

(57) ABSTRACT

A blast furnace includes: a blast furnace body; raw material charging means for charging raw material into the blast furnace body; hot air blowing means for blowing hot air into the blast furnace body; a drying apparatus etc. for evaporating moisture in low-grade coal; a dry distillation apparatus etc. for carbonizing dried coal; a cooling apparatus etc. for cooling carbonized coal; a pulverization apparatus etc. for pulverizing the carbonized coal cooled by the cooling apparatus; a storage tank for storing powdered coal; a nitrogen gas supply source, a conveyor line and a cyclone separator etc. for conveying the powdered coal pulverized by the pulverization apparatus to the inside of the storage tank by generating a gas flow with the nitrogen gas; and an
(Continued)

injection lance etc. for feeding the powdered coal inside the storage tank to hot air that is blown into the blast furnace body.

7 Claims, 2 Drawing Sheets

(51) Int. Cl.
    *F27B 1/20*       (2006.01)
    *F27D 3/00*       (2006.01)
    *C10B 53/04*     (2006.01)
    *C10F 5/00*       (2006.01)
    *C10L 9/08*       (2006.01)

(52) U.S. Cl.
    CPC ............... *C21B 5/003* (2013.01); *C21B 7/163* (2013.01); *F27B 1/20* (2013.01); *F27D 3/0033* (2013.01); *F27D 2003/0034* (2013.01); *F27M 2003/025* (2013.01); *F27M 2003/14* (2013.01); *Y02E 50/15* (2013.01)

(58) Field of Classification Search
    USPC ........................................................ 266/197
    See application file for complete search history.

(56) References Cited

U.S. PATENT DOCUMENTS

| | | | |
|---|---|---|---|
| 2015/0008626 A1* | 1/2015 | Omoto | C21B 5/003 266/137 |
| 2015/0176096 A1* | 6/2015 | Omoto | C21B 5/003 75/463 |
| 2015/0203929 A1* | 7/2015 | Omoto | C21B 5/003 75/460 |
| 2015/0225804 A1* | 8/2015 | Sakaguchi | C21B 7/16 266/47 |
| 2015/0247212 A1* | 9/2015 | Sakaguchi | C21B 7/163 266/266 |

FOREIGN PATENT DOCUMENTS

| | | |
|---|---|---|
| JP | 11-92809 A | 4/1999 |
| JP | 11-310785 A | 11/1999 |
| JP | 2004-238692 A | 8/2004 |
| JP | 2005-68474 A | 3/2005 |
| JP | 2006-63417 A | 3/2006 |
| JP | 2011-102439 A | 5/2011 |
| JP | 2011-127010 A | 6/2011 |
| KR | 10-2007-0045037 A | 5/2007 |
| KR | 10-2009-0097290 A | 9/2009 |
| WO | 2011/074279 A1 | 6/2011 |

OTHER PUBLICATIONS

Office Action dated Jul. 17, 2015, issued in counterpart Korean application No. 2014-7019698 (w/English translation) (8 pages).

Notification of Transmittal of Translation of the International Preliminary Report on Patentability (form PCT/IB/338) of International Application No. PCT/JP2013/050623, dated Jul. 31, 2014, with forms PCT/ISA/237 and PCT/ISA/210, w/English translation (18 pages).

Japanese Notice of Allowance dated Oct. 20, 2015, issued in corresponding Japanese Patent Application No. 2014-528025 (w/English translation) (5 pages).

* cited by examiner

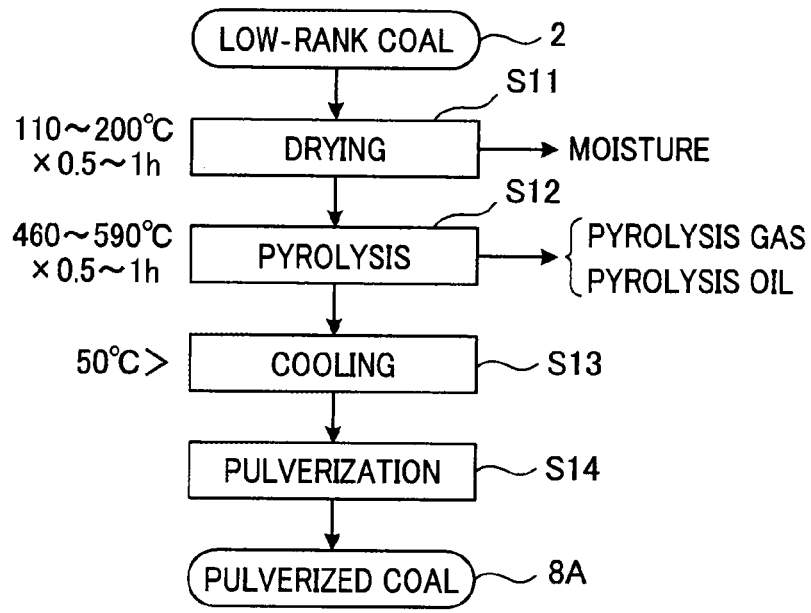
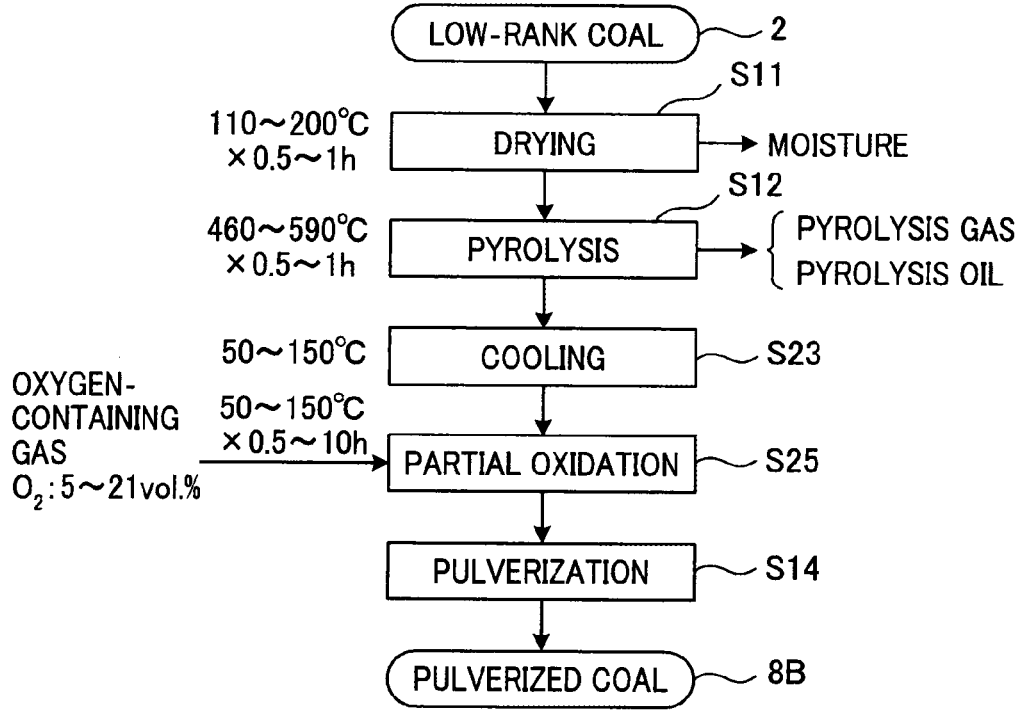

BLAST FURNACE

TECHNICAL FIELD

The present invention relates to a blast furnace installation.

BACKGROUND ART

Blast furnace installations are designed to be capable of manufacturing pig iron from iron ore by charging raw materials such as iron ore, limestone, and coal into the blast furnace main unit through the top and blowing hot air and pulverized coal (PCI coal) as auxiliary fuel through the tuyeres on the lower lateral side.

CITATION LIST

Patent Literatures

Patent Literature 1: Japanese Patent Application Publication No. Hei 10-060508
Patent Literature 2: Japanese Patent Application Publication No. Hei 11-092809

SUMMARY OF INVENTION

Technical Problem

The PCI coal to be blown into the blast furnace main unit as auxiliary fuel is required to have high combustibility because if unburned carbon is generated, the unburned carbon may possibly obstruct the flow of combusted gas. For this reason, anthracite, bituminous coal, and the like, which are high quality and expensive, have been used, thereby increasing the manufacturing cost of pig iron.

In view of the above, an object of the present invention is to provide a blast furnace installation capable of reducing the manufacturing cost of pig iron.

Solution to Problem

A blast furnace installation according to a first aspect of the invention for solving the above-mentioned problem is a blast furnace installation including a blast furnace main unit, raw material charging means for charging a raw material into the blast furnace main unit from a top thereof, hot air blowing means for blowing hot air into the blast furnace main unit from a tuyere thereof, and pulverized coal feeding means for feeding pulverized coal into the blast furnace main unit from the tuyere, characterized in that the pulverized coal feeding means includes moisture removing means for vaporizing moisture in low-rank coal, pyrolysis means for performing pyrolysis on the coal from which the moisture is removed by the moisture removing means, cooling means for cooling the coal on which the pyrolysis is performed by the pyrolysis means, pulverizing means for pulverizing the coal cooled by the cooling means, a storage tank configured to store the coal pulverized by the pulverizing means, transferring means for transferring the coal pulverized by the pulverizing means into the storage tank with a stream of inert gas, and delivering means for delivering the coal in the storage tank into the hot air that is being blown into the blast furnace main unit.

A blast furnace installation according to a second aspect of the invention is the first aspect of the invention, characterized in that the pyrolysis means heats the coal at a temperature between 400 and 600° C.

A blast furnace installation according to a third aspect of the invention is the first or second aspect of the invention, characterized in that the cooling means cools the coal to 200° C. or below in an inert gas atmosphere.

A blast furnace installation according to a fourth aspect of the invention is any one of the first to third aspects of the invention, characterized in that he pulverizing means pulverizes the coal to a diameter of 100 µm or smaller in an inert gas atmosphere.

A blast furnace installation according to a fifth aspect of the invention is any one of the first to fourth aspects of the invention, characterized in that the low-rank coal is any one of subbituminous coal and brown coal.

A blast furnace installation according to a sixth aspect of the invention is any one of the first to fifth aspects of the invention, characterized in that the pulverized coal has an oxygen atom content ratio (dry base) between 10 and 20% by weight and has an average pore size between 10 and 50 nm.

Advantageous Effects of Invention

According to the blast furnace installations according to the present invention, it is possible to impart high combustibility to inexpensive low-rank coal and use it as PCI coal by drying and pyrolyzing the low-rank coal to obtain pyrolysis coal high in reaction activity with oxygen, cooling and pulverizing the pyrolysis coal, and transferring it with a stream of nitrogen gas, and storing it inside the storage tank. Accordingly, the manufacturing cost of pig iron can be reduced. In addition, since the pyrolysis coal and the pulverized coal to which the high combustibility is imparted can be used after they are stored and transported only for a short period of time, instead of being stored and transported for a long period of time, high safety can be secured easily.

BRIEF DESCRIPTION OF DRAWINGS

FIG. 2 is a flowchart showing a procedure for manufacturing preferred pulverized coal to be utilized in the blast furnace installation according to the present invention.

FIG. 3 is a flowchart showing a procedure for manufacturing another preferred pulverized coal to be utilized in the blast furnace installation according to the present invention.

DESCRIPTION OF EMBODIMENT

Figure 1:
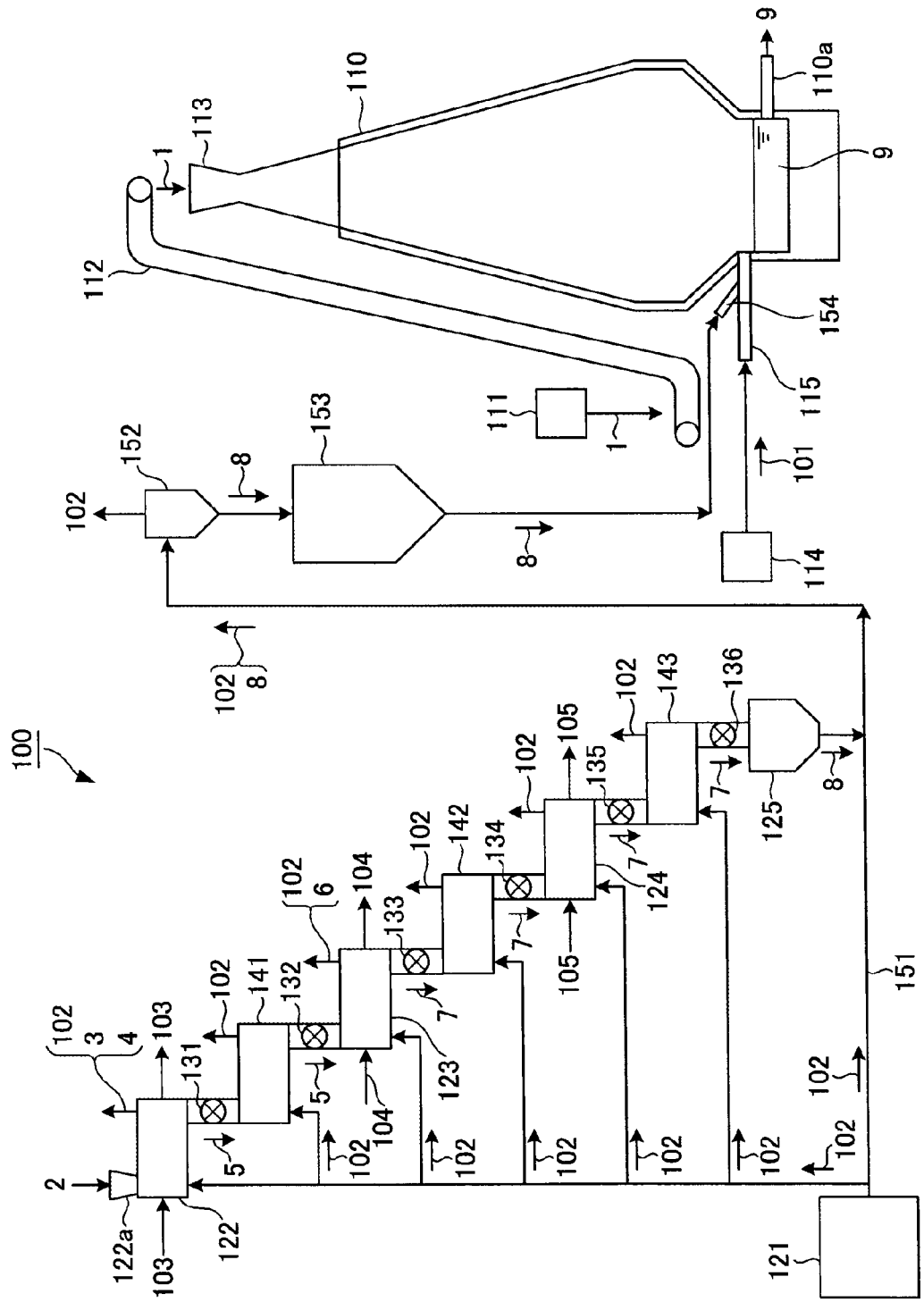
FIG. 1 is a schematic configuration diagram of a chief part of a main embodiment of a blast furnace installation according to the present invention.

An embodiment of a blast furnace installation according to the present invention will be described with reference to the drawings. However, the blast furnace installation according to the present invention is not limited only to the embodiment to be described below with reference to the drawings.

<Main Embodiment>

A main embodiment of the blast furnace installation according to the present invention will be described with reference to FIG. 1.

As shown in FIG. 1, a predetermined-amount raw material feed device 111 configured to feed predetermined amounts of raw materials 1 such as iron ore, limestone, and coal communicates with the upstream side of a charge conveyer 112 in its transfer direction, the charge conveyer 112 being configured to transfer the raw materials 1. The downstream side of this charge conveyer 112 communicates with the upper side of a furnace top hopper 113 at the top of a blast furnace main unit 110. A hot air delivery device 114 configured to deliver hot air 101 (1000 to 1300° C.) communicates with a blow pipe 115 provided at each tuyere of the blast furnace main unit 110.

Note that in this embodiment, the predetermined-amount raw material feed device 111, the charge conveyer 112, the furnace top hopper 113, etc. serve as raw material charging means, and the hot air delivery device 114, the blow pipe 115, etc. serve as hot air blowing means.

Meanwhile, in the vicinity of the blast furnace main unit 110, a steam tube dryer type drying device 122 is arranged which is configured to vaporize moisture 3 in low-rank coal 2 such as subbituminous coal or brown coal. Nitrogen gas 102 as inert gas is fed into the drying device 122 from a nitrogen gas feed source 121 serving as inert gas feeding means, and water vapor 103 as a heating medium is fed into a coil-shaped heating pipe arranged in a center portion of the drying device 122. In this way, the drying device 122 can create a low oxygen atmosphere (about several %) inside and heat the low-rank coal 2 fed from a hopper 122a (at 100 to 200° C.) to remove the moisture 3 and volatile components 4 which volatilize at relatively low temperatures from the low-rank coal 2, so that dried coal 5 is manufactured. At the same time, the drying device 122 can discharge the moisture 3 and the volatile components 4 to the outside together with the nitrogen gas 102.

A discharge port of the drying device 122 for the dried coal 5 is connected to the upstream side of a conveyer 141 in its transfer direction with a rotary valve 131 therebetween, the conveyer 141 including a shield hood covering its periphery. The nitrogen gas 102 from the nitrogen gas feed source 121 is fed to the inside of the shield hood of the conveyer 141, so that the inside of the shield hood of the conveyer 141 is a nitrogen gas atmosphere.

The downstream side of the conveyer 141 in the transfer direction is connected to a receive port of a rotary kiln type pyrolysis device 123 for the dried coal 5 with a rotary valve 132 therebetween, the pyrolysis device 123 being configured to perform pyrolysis on the dried coal 5. The nitrogen gas 102 is fed into the pyrolysis device 123 from the nitrogen gas feed source 121, and combusted gas 104 as a heating medium is fed into a jacket fixedly supported on the outer side. In this way, the pyrolysis device 123 can create a nitrogen gas atmosphere inside and heat the dried coal 5 (at 400 to 600° C.) to remove volatile components 6 which volatilize at high temperatures from the dried coal 5, so that pyrolysis coal 7 is manufactured. At the same time, the pyrolysis device 123 can discharge the volatile components 6 to the outside together with the nitrogen gas 102.

A discharge port of the pyrolysis device 123 for the pyrolysis coal 7 is connected to the upstream side of a conveyer 142 in its transfer direction with a rotary valve 133 therebetween, the conveyer 142 including a shield hood covering its periphery. The nitrogen gas 102 from the nitrogen gas feed source 121 is fed to the inside of the shield hood of the conveyer 142, so that the inside of the shield hood of the conveyer 142 is a nitrogen gas atmosphere.

The downstream side of the conveyer 142 in the transfer direction is connected to a receive port of a steam tube dryer type cooling device 124 for the pyrolysis coal 7 with a rotary valve 134 therebetween, the cooling device 124 being configured to cool the pyrolysis coal 7. The nitrogen gas 102 is fed into the cooling device 124 from the nitrogen gas feed source 121, and cooling water 105 as a cooling medium is fed into a coil-shaped cooling pipe arranged in a center portion of the cooling device 124. In this way, the cooling device 124 can create a nitrogen gas atmosphere inside and cool the pyrolysis coal 7 (to 200° C. or below).

A discharge port of the cooling device 124 for the pyrolysis coal 7 is connected to the upstream side of a conveyer 143 in its transfer direction with a rotary valve 135 therebetween, the conveyer 143 including a shield hood covering its periphery. The nitrogen gas 102 from the nitrogen gas feed source 121 is fed to the inside of the shield hood of the conveyer 143, so that the inside of the shield hood of the conveyer 143 is a nitrogen gas atmosphere.

The downstream side of the conveyer 143 in the transfer direction is connected to a receive port of a mill type pulverization device 125 for the pyrolysis coal 7 with a rotary valve 136 therebetween, the pulverization device 125 being configured to pulverize the pyrolysis coal 7. The pulverization device 125 can maintain a nitrogen gas atmosphere inside with the nitrogen gas delivered therein together with the pyrolysis coal 7 and pulverize the pyrolysis coal 7 to obtain pulverized coal 8 (with a diameter of 100 μm or smaller).

A lower portion of the pulverization device 125 is connected to a given point on a transfer line 151 extending from the nitrogen gas feed source 121. The transfer line 151 is connected to a receive port of a cyclone separator 152 serving as separating means for separating the pulverized coal 8 from a stream of the nitrogen gas 102. A lower portion of the cyclone separator 152 is connected to the upper side of a storage tank 153 configured to store the pulverized coal 8. The storage tank 153 can maintain a nitrogen gas atmosphere inside.

A lower portion of the storage tank 153 is connected to an injection lance 154 connected to the blow pipe 115. The pulverized coal 8 in the storage tank 153 can be fed into the blow pipe 115 through the injection lance 154.

Note that reference sign 110a in FIG. 1 denotes a tap hole through which to take out molten pig iron (hot metal) 9.

In this embodiment described above, the nitrogen gas feed source 121, the drying device 122, the rotary valve 131, etc. serve as moisture removing means; the nitrogen gas feed source 121, the pyrolysis device 123, the rotary valves 132 and 133, the conveyer 141, etc. serve as pyrolysis means; the nitrogen gas feed source 121, the cooling device 124, the rotary valves 134 and 135, the conveyer 142, etc. serve as cooling means; the nitrogen gas feed source 121, the pulverization device 125, the rotary valve 136, the conveyer 143, the like serve as pulverizing means; the nitrogen gas feed source 121, the transfer line 151, the cyclone separator 152, etc. serve as transferring means; and the injection lance 154 etc. serve as delivering means.

Next, the operation of a blast furnace installation 100 according to this embodiment will be described.

As predetermined amounts of the raw materials 1 are fed from the predetermined-amount raw material feed device 111, the raw materials 1 are fed into the furnace top hopper 113 by the charge conveyer 112 and charged into the blast furnace main unit 110.

On the other hand, the nitrogen gas 102 is fed from the nitrogen gas feed source 121, and the low-rank coal 2 is fed into the drying device 122 from the hopper 122a of the drying device 122. As a result, the low-rank coal 2 is heated (at 100 to 200° C.) in a low oxygen atmosphere (about several %) by the water vapor 103 through the heating pipe, so that the moisture 3 and the volatile components 4 vaporize and are discharged to the outside of the system together with the nitrogen gas 102. Accordingly, the low-rank coal 2 is dried and becomes dried coal 5.

Note that the nitrogen gas 102 containing the volatile components 4 undergoes combustion treatment in a combustion furnace not shown and is utilized as the combusted gas 104, and thereafter undergoes purification treatment.

The dried coal 5 is delivered onto the conveyer 141 through the rotary valve 131, transferred through a nitrogen gas atmosphere, fed into the pyrolysis device 123 through the rotary valve 132, and heated (at 400 to 600° C.) in a nitrogen gas atmosphere by the combusted gas 104 through the heating pipe, so that the volatile components 6 vaporize and are discharged to the outside of the system together with the nitrogen gas 102. As a result, the dried coal 5 undergoes pyrolysis and becomes pyrolysis coal 7 high in reaction activity with oxygen.

Note that the nitrogen gas 102 containing the volatile components 6 undergoes combustion treatment in a combustion furnace not shown and is utilized as the combusted gas 104, and thereafter undergoes purification treatment.

The pyrolysis coal 7 is delivered onto the conveyer 142 through the rotary valve 133, transferred through a nitrogen gas atmosphere, fed into the cooling device 124 through the rotary valve 134, cooled (to 200° C. or below) in a nitrogen gas atmosphere by the cooling water 105 through the cooling pipe, delivered onto the conveyer 143 through the rotary valve 135, transferred through a nitrogen gas atmosphere, fed into the pulverization device 125 through the rotary valve 136, and pulverized (to a diameter of 100 μm or smaller) in a nitrogen gas atmosphere. As a result, the pyrolysis coal 7 becomes pulverized coal (PCI coal) 8.

The pulverized coal (PCI coal) 8 is transferred through the transfer line 151 from the pulverization device 125 by the stream of the nitrogen gas 102 from the nitrogen gas feed source 121, and delivered into the cyclone separator 152 to be separated from the stream of the nitrogen gas 102. As a result, the pulverized coal (PCI coal) 8 is stored in a nitrogen gas atmosphere inside the storage tank 153.

The pulverized coal (PCI coal) 8 stored in the storage tank 153 is delivered into the blow pipe 115 through the injection lance 154, and combusted as fed into the hot air 101 delivered into the blow pipe 115 from the hot air delivery device 114. As a result, the pulverized coal (PCI coal) 8 turns into a flame and forms a raceway at the tip of the blow pipe 115, thereby burning the coal and the like in the raw materials 1 inside the blast furnace main unit 110. Accordingly, the iron ore in the raw materials 1 is reduced and taken out as pig iron (hot metal) 9 from the tap hole 110a.

In sum, while conventional blast furnace installations use anthracite, bituminous coal, or the like, which is high quality and expensive, as PCI coal, the blast furnace installation 100 according to this embodiment can impart high combustibility to inexpensive low-rank coal 2 such as subbituminous coal or brown coal and safely use it as PCI coal by drying and performing pyrolysis the low-rank coal 2 to obtain pyrolysis coal 7 high in reaction activity with oxygen (the reactivity with oxygen is approximately 20 times greater than that of the low-rank coal 2), cooling and pulverizing the pyrolysis coal 7 in a nitrogen gas atmosphere, transferring it with a stream of nitrogen gas, and storing it in a nitrogen gas atmosphere inside the storage tank 153.

Thus, according to the blast furnace installation 100 according to this embodiment, inexpensive low-rank coal 2 can be used as the PCI coal 8. Accordingly, the manufacturing cost of the pig iron 9 can be reduced.

Meanwhile, the pyrolysis coal 7 and the pulverized coal 8 to which the high combustibility is imparted can be used after they are stored and transported only for a short period of time, instead of being stored and transported for a long period of time. Accordingly, high safety can be secured easily.

Here, pulverized coal (PCI coal) 8A with an oxygen atom content ratio (dry base) of 10 to 18% by weight and an average pore size of 10 to 50 nm (nanometer) (preferably 20 to 50 nm (nanometer)) is preferable.

As shown in FIG. 2, the pulverized coal (PCI coal) 8A as mentioned above can be easily manufactured by: drying low-rank coal (oxygen atom content ratio (dry base): over 18% by weight, average pore size: 3 to 4 nm) 2 such as subbituminous coal or brown coal by heating it (at 110 to 200° C.×0.5 to 1 hour) in a low oxygen atmosphere (oxygen concentration: 5% by volume or lower) to remove moisture (drying step S11); performing pyrolysis on the resultant coal by heating it (at 460 to 590° C. (preferably 500 to 550° C.)×0.5 to 1 hour) in a low oxygen atmosphere (oxygen concentration: 2% by volume or lower) to remove produced water, carbon dioxide, tar, and the like as pyrolysis gas and pyrolysis oil (pyrolysis step S12); cooling the resultant coal (to 50° C. or below) in a low oxygen atmosphere (oxygen concentration: 2% by volume or lower) (cooling step S13); and pulverizing the resultant coal (to a particle size: 77 μm or smaller (80% pass)) (pulverizing step S14).

In the pulverized coal (PCI coal) 8A as mentioned above, the average pore size is 10 to 50 nm, that is, tar producing groups such as oxygen-containing functional groups (such as carboxyl groups, aldehyde groups, ester groups, and hydroxyl groups) desorb and greatly decrease, while the oxygen atom content ratio (dry base) is 10 to 18% by weight, that is, decomposition (decrease) of the main skeletons (combustion components mainly containing C, H, and O) is greatly suppressed. Hence, when the pulverized coal (PCI coal) 8A is blown into the blast furnace main unit through the tuyere together with hot air, the pulverized coal (PCI coal) 8A can be completely combusted with almost no unburned carbon (soot) generated because many oxygen atoms are contained in the main skeletons and also because the large-sized pores allow the oxygen in the hot air to be easily spread to the inside and also significantly suppresses the production of tar. Accordingly, the combustion efficiency can be improved at a low cost.

Moreover, since the average pore size is not smaller than 10 nm, the pulverized coal (PCI coal) 8A can prevent a situation where the spreadability of the oxygen in the hot air to the inside is deteriorated and the combustibility is accordingly deteriorated. In addition, since the average pore size is 50 nm or smaller, the pulverized coal (PCI coal) 8A can be prevented from cracking into smaller sizes due to heat shock and the like, and can therefore be prevented from cracking into smaller sizes when blown into the blast furnace main unit, which makes it possible to prevent the pulverized coal (PCI coal) 8A from passing through the inside of the blast furnace main unit with the gas stream and being discharged without combustion.

Further, since the oxygen atom content ratio (dry base) is not smaller than 10% by weight, the pulverized coal (PCI coal) 8A can be completely combusted without adding oxidant or enriching the oxygen in the hot air.

Furthermore, the pore volume of the pulverized coal (PCI coal) 8A is preferably 0.05 to 0.5 cm$^3$/g and particularly preferably 0.1 to 0.2 cm$^3$/g. This is because the surface area of contact (surface area of reaction) with the oxygen in the hot air will be small and the combustibility will possibly be deteriorated if the pore volume is smaller than 0.05 cm$^3$/g, whereas large amounts of components will volatilize and the pulverized coal (PCI coal) 8A will be so porous that the combustion components may be excessively reduced if the pore volume is larger than 0.5 cm$^3$/g.

In addition, the specific surface area of the pulverized coal (PCI coal) 8A is preferably 1 to 100 m$^2$/g and particularly preferably 5 to 20 m$^2$/g. This is because the surface area of contact (surface area of reaction) with the oxygen in the hot air will be small and the combustibility will possibly be deteriorated if the specific surface area is smaller than 1 m$^2$/g, whereas large amounts of components will volatilize and the pulverized coal (PCI coal) 8A will be so porous that the combustion components may be excessively reduced if the specific surface area is larger than 100 m$^2$/g.

Moreover, since the temperature of the pyrolysis in the pyrolysis step S12 is 460 to 590° C., the tar producing groups such as oxygen-containing functional groups can be desorbed sufficiently from the low-rank coal 2, and the average pore size can easily be 10 to 50 nm. In addition, the decomposition of the main skeletons (combustion components mainly containing C, H, and O) of the low-rank coal 2 can be suppressed, and the reduction of the combustion components due to the volatilization of large amounts of components can be suppressed.

Further, pulverized coal (PCI coal) 8B with an oxygen atom content ratio (dry base) of 12 to 20% by weight and an average pore size of 10 to 50 nm (preferably 20 to 50 nm) is more preferable.

As shown in FIG. 3, the pulverized coal (PCI coal) 8B as mentioned above can be easily manufactured by: drying the low-rank coal (oxygen atom content ratio (dry base): over 18% by weight) 2 in a similar way to as described above (drying step S11); performing pyrolysis on the resultant coal in a similar way to as described above (pyrolysis step S12); cooling the resultant coal (to 50 to 150° C.) in a low oxygen atmosphere (oxygen concentration: 2% by volume or lower) (cooling step S23); partially oxidizing the resultant coal by exposing it to an oxygen-containing atmosphere (oxygen concentration: 5 to 21% by volume) (at 50 to 150° C.×0.5 to 10 hours) to let the coal chemically adsorb oxygen (partially oxidizing step S25); and pulverizing the resultant coal in a similar way to as described above (pulverizing step S14).

In the pulverized coal (PCI coal) 8B as mentioned above, like the pulverized coal 8A, the average pore size is 10 to 50 nm, that is, tar producing groups such as oxygen-containing functional groups (such as carboxyl groups, aldehyde groups, ester groups, and hydroxyl groups) desorb and greatly decrease, while the oxygen atom content ratio (dry base) is 12 to 20% by weight, that is, decomposition (decrease) of the main skeletons (combustion components mainly containing C, H, and O) is greatly suppressed, and more oxygen atoms have chemically adsorbed. Hence, when the pulverized coal (PCI coal) 8B is blown into the blast furnace main unit through the tuyere together with hot air, the pulverized coal (PCI coal) 8B can be completely combusted with unburned carbon (soot) generated less than when the pulverized coal 8A is combusted because the main skeletons contains more oxygen atoms than the pulverized coal 8A and also because the large-sized pores allow the oxygen in the hot air to be easily spread to the inside and also significantly suppresses the production of tar like the pulverized coal 8A. Accordingly, the combustion efficiency can be improved at a low cost more reliably than the pulverized coal 8A does.

Moreover, like the pulverized coal 8A, since the average pore size is not smaller than 10 nm, the pulverized coal (PCI coal) 8B can prevent a situation where the spreadability of the oxygen in the hot air to the inside is deteriorated and the combustibility is accordingly deteriorated. In addition, like the pulverized coal 8A, since the average pore size is 50 nm or smaller, the pulverized coal (PCI coal) 8B can be prevented from cracking into smaller sizes due to heat shock and the like, and can therefore be prevented from cracking into smaller sizes when blown into the blast furnace main unit, which makes it possible to prevent the pulverized coal (PCI coal) 8B from passing through the inside of the blast furnace main unit with the gas stream and being discharged without combustion.

Further, since the oxygen atom content ratio (dry base) in the pulverized coal (PCI coal) 8B is 20% by weight or lower, it is possible to prevent a situation where the oxygen content is excessively large and the amount of heat generation is excessively reduced.

Further, like the pulverized coal 8A, the pore volume of the pulverized coal (PCI coal) 8B is preferably 0.05 to 0.5 cm$^3$/g and particularly preferably 0.1 to 0.2 cm$^3$/g. This is because the surface area of contact (surface area of reaction) with the oxygen in the hot air will be small and the combustibility will possibly be deteriorated if the pore volume is smaller than 0.05 cm$^3$/g, whereas large amounts of components will volatilize and the pulverized coal (PCI coal) 8B will be so porous that the combustion components may be excessively reduced if the pore volume is larger than 0.5 cm$^3$/g.

In addition, like the pulverized coal 8A, the specific surface area of the pulverized coal (PCI coal) 8B is preferably 1 to 100 m$^2$/g and particularly preferably 5 to 20 m$^2$/g. This is because the surface area of contact (surface area of reaction) with the oxygen in the hot air will be small and the combustibility will possibly be deteriorated if the specific surface area is smaller than 1 m$^2$/g, whereas large amounts of components will volatilize and the pulverized coal (PCI coal) 8B will be so porous that the combustion components may be excessively reduced if the specific surface area is larger than 100 m$^2$/g.

Moreover, since the temperature of the process in the partially oxidizing step S25 is 50 to 150° C., generation of carbon monoxide and carbon dioxide by the combustion reaction can be suppressed even in an air (oxygen concentration: 21% by volume) atmosphere, and also the partial oxidation process can advance even in an atmosphere where the oxygen concentration is about 5% by volume.

In the embodiment described above, the case where a steam tube dryer type is applied to the drying device 122 and the cooling device 124 is described. Note, however, that a rotary kiln type like the pyrolysis device 123 can be applied to the drying device and the cooling device.

INDUSTRIAL APPLICABILITY

The blast furnace installation according to the present invention can reduce the manufacturing cost of pig iron and can therefore be utilized significantly beneficially in the steel industry.

REFERENCE SIGNS LIST

1 raw material
2 low-rank coal
3 moisture
4, 6 volatile component
5 dried coal
7 pyrolysis coal
8, 8A, 8B pulverized coal (PCI coal)
9 pig iron (hot metal)

100 blast furnace installation
101 hot air
102 nitrogen gas
103 water vapor
104 combusted gas
105 cooling water
110 blast furnace main unit
110a tap hole
111 predetermined-amount raw material feed device
112 charge conveyer
113 furnace top hopper
114 hot air delivery device
115 blow pipe
121 nitrogen gas feed source
122 drying device
122a hopper
123 pyrolysis device
124 cooling device
125 pulverization device
131 to 136 rotary valve
141 to 143 conveyer
151 transfer line
152 cyclone separator
153 storage tank
154 injection lance

The invention claimed is:

1. A method for operating a blast furnace installation comprising:
a blast furnace main unit;
raw material charging means for charging a raw material into the blast furnace main unit from a top thereof;
hot air blowing means for blowing hot air into the blast furnace main unit from a tuyere thereof; and
pulverized coal feeding means for feeding pulverized coal into the blast furnace main unit from the tuyere, wherein
the pulverized coal feeding means is configured to:
vaporize moisture in low-rank coal with a moisture removing means;
perform pyrolysis on the coal from which the moisture is removed by the moisture removing means with a pyrolysis means;
cool the coal on which the pyrolysis is performed by the pyrolysis means with a cooling means;
pulverize the coal cooled by the cooling means with a pulverizing means;
store the coal pulverized by the pulverizing means with a storage tank;
transfer the coal pulverized by the pulverizing means with a transferring means into the storage tank with a stream of inert gas; and
deliver the coal in the storage tank into the hot air that is being blown into the blast furnace main unit with a delivering means, wherein
the pulverized coal has an oxygen atom content ratio between 10 and 20% by weight and has an average pore size between 10 and 50 nm.

2. The method for operating a blast furnace installation according to claim 1, wherein the pyrolysis means heats the coal at a temperature between 400 and 600° C.

3. The method for operating a blast furnace installation according to claim 1, wherein the cooling means cools the coal to 200° C. or below in an inert gas atmosphere.

4. The method for operating a blast furnace installation according to claim 1, wherein the pulverizing means pulverizes the coal to a diameter of 100 μm or smaller in an inert gas atmosphere.

5. The method for operating a blast furnace installation according to claim 1, wherein the low-rank coal is any one of subbituminous coal and brown coal.

6. The method for operating a blast furnace installation according to claim 1, wherein the pulverized coal has a pore volume of 0.05 to 0.5 cm$^3$/g.

7. The method for operating a blast furnace installation according to claim 1, wherein the pulverized coal has a specific surface area of 1 to 100 m$^2$/g.

* * * * *